US012683976B2

(12) United States Patent
Bowers et al.

(10) Patent No.: US 12,683,976 B2
(45) Date of Patent: Jul. 14, 2026

(54) SYSTEM AND METHOD FOR CONTINUOUS MONITORING AND REVOCATION OF DEVICE ACCESS AUTHORIZATION

(71) Applicant: Barracuda Networks, Inc., Campbell, CA (US)

(72) Inventors: Jeremy Paul Bowers, Brighton, MI (US); Benjamin Roberto Magee, Ann Arbor, MI (US)

(73) Assignee: Barracuda Networks, Inc., Campbell, CA (US)

( * ) Notice: Subject to any disclaimer, the term of this patent is extended or adjusted under 35 U.S.C. 154(b) by 143 days.

(21) Appl. No.: 18/422,966

(22) Filed: Jan. 25, 2024

(65) Prior Publication Data

US 2024/0364705 A1      Oct. 31, 2024

Related U.S. Application Data

(60) Provisional application No. 63/461,988, filed on Apr. 26, 2023.

(51) Int. Cl.
*H04L 9/40*          (2022.01)
(52) U.S. Cl.
CPC ........ *H04L 63/108* (2013.01); *H04L 63/0892* (2013.01)
(58) Field of Classification Search
CPC .......................... H04L 63/108; H04L 63/0892
See application file for complete search history.

(56) References Cited

U.S. PATENT DOCUMENTS

| | | | | |
|---|---|---|---|---|
| 9,521,032 B1 * | 12/2016 | Worsley | ............... | G06F 21/305 |
| 10,044,707 B1 * | 8/2018 | Ji | ........................... | H04L 9/0891 |
| 2014/0165147 A1 * | 6/2014 | Hershberg | ............ | H04L 63/083 726/4 |
| 2017/0134367 A1 * | 5/2017 | Roth | ..................... | H04L 67/146 |
| 2018/0167397 A1 * | 6/2018 | Zhang | .................. | H04L 63/126 |
| 2018/0288048 A1 * | 10/2018 | Gibbons | .............. | H04L 63/102 |
| 2019/0286832 A1 * | 9/2019 | Szeto | .................. | H04W 12/082 |
| 2021/0037059 A1 * | 2/2021 | Achari | .................. | H04L 63/104 |

(Continued)

OTHER PUBLICATIONS

Huhtanen, Karri; Kolehmainen, Antti; "Fault-tolerant Distributed AAA Architecture Supporting Connectivity Disruption," Thirteenth International Conference on Ubiquitous and Future Networks (ICUFN), Barcelona, Spain, Jul. 5-8, 2022, IEEE, pp. 405-407.*

*Primary Examiner* — Victor Lesniewski

(57) ABSTRACT

A new approach is proposed to support an authorization server to continuously monitor and revoke device access authorization to a plurality of resources. A client device associated with a user or consumer first sends a request to the authorization server for authorization to access or perform certain operations on one or more resources. Upon receiving the request, the authorization server makes an initial authorization determination on whether to grant or deny the request for authorization to the one or more resources by the client device based on the type of the request and/or the one or more resources requested to access. After an initial authorization determination is made, the authorization server continues to monitor the resources being accessed and update the initial authorization determination to the client device in real time. An live update in the authorization determination is then provided to the client device in real time.

21 Claims, 3 Drawing Sheets

(56)        References Cited

U.S. PATENT DOCUMENTS

| | | | |
|---|---|---|---|
| 2021/0226997 A1* | 7/2021 | Mitevski | H04L 63/108 |
| 2022/0046018 A1* | 2/2022 | Mullender | H04L 63/0815 |
| 2022/0200994 A1* | 6/2022 | Passey | G06F 16/90348 |
| 2022/0272104 A1* | 8/2022 | Yamanakajima | H04L 63/102 |
| 2023/0275886 A1* | 8/2023 | Malik | G06F 21/604 |
| | | | 726/17 |
| 2023/0396557 A1* | 12/2023 | Pazhyannur | H04L 63/0892 |
| 2024/0039910 A1* | 2/2024 | Falk | H04W 12/084 |

* cited by examiner

100

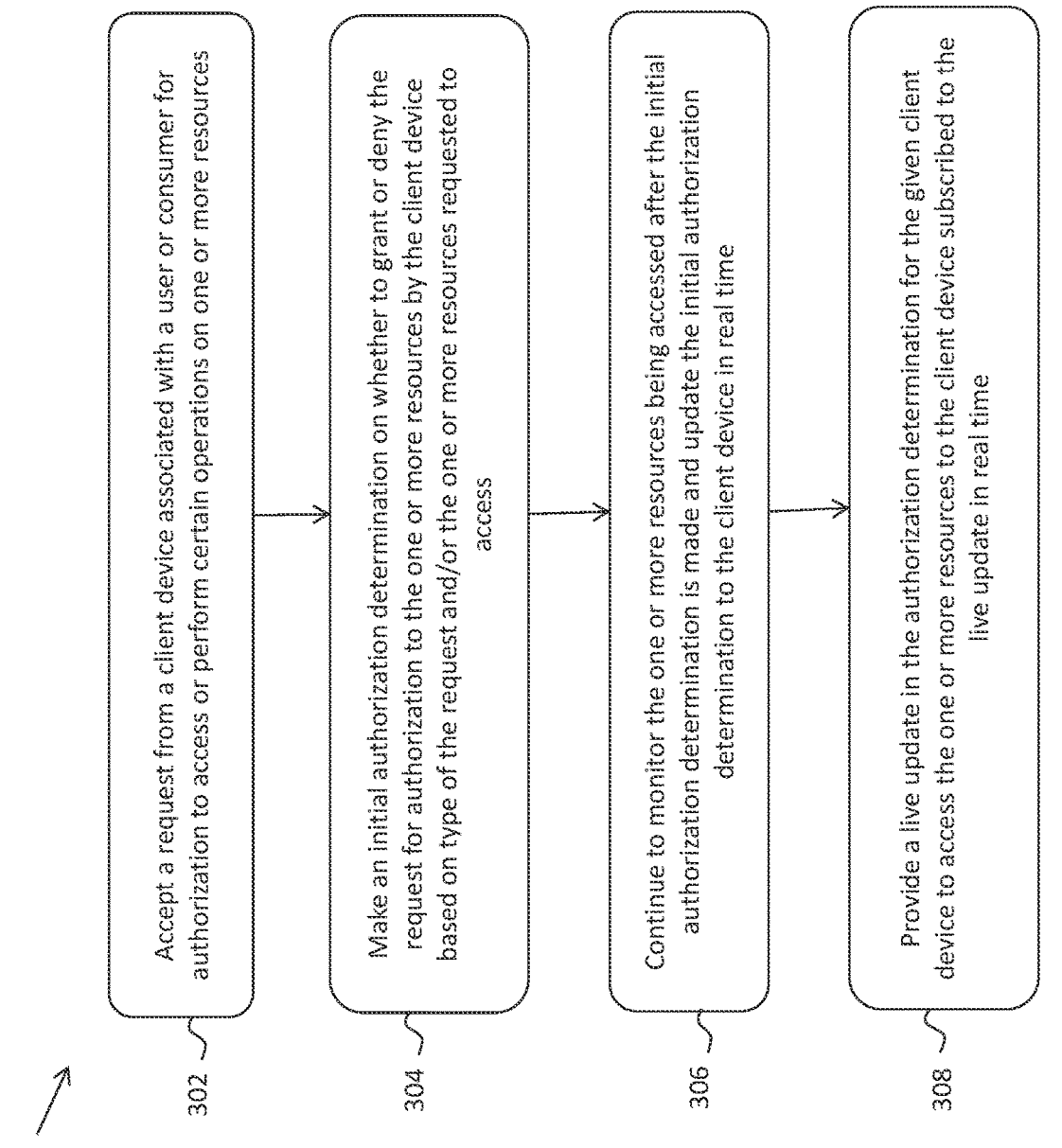

302 — Accept a request from a client device associated with a user or consumer for authorization to access or perform certain operations on one or more resources 304 — Make an initial authorization determination on whether to grant or deny the request for authorization to the one or more resources by the client device based on type of the request and/or the one or more resources requested to access 306 — Continue to monitor the one or more resources being accessed after the initial authorization determination is made and update the initial authorization determination to the client device in real time 308 — Provide a live update in the authorization determination for the given client device to access the one or more resources to the client device subscribed to the live update in real time

SYSTEM AND METHOD FOR CONTINUOUS MONITORING AND REVOCATION OF DEVICE ACCESS AUTHORIZATION

CROSS-REFERENCE TO RELATED APPLICATIONS

This application claims the benefit of U.S. Provisional Patent Application No. 63/461,988, filed Apr. 26, 2023, which is incorporated herein in its entirety by reference.

BACKGROUND

A company may manufacture. provide, and deploy to its customers a wide variety of devices/appliances/machines, wherein such devices include but are not limited to computing devices, communication devices, storage devices, and other types of devices capable of providing a service to the customers. In some cases, a so-called "support tunnel" is often used by the company to support a customer of its devices, wherein the support tunnel allows a support personnel/user to remotely log in to a device of the customer via a remote shell login. For a non-limiting example, the remote shell login may prompt the user to provide a user id and a valid password for the login. In some cases, an authorization or "judge" server is utilized, which answers/responses to a question/inquiry of whether a given user is allowed to access the device of the customer based on a variety of criteria.

Currently, all authorization servers being deployed are based on a point-in-time check where each authorization server determines if a support personnel is allowed to log in to a device only at the time the support personnel attempts to do so. The permission and authorization by the authorization server to allow the support personnel to log in to the device is highly transient, extending only for the duration of the support case being open or support is needed, which may be hours or even minutes. However, a shell login connection may continue indefinitely. As a result, the support user or another authorized person may continue to be able to access the device long after the authorization for the support case has expired.

The foregoing examples of the related art and limitations related therewith are intended to be illustrative and not exclusive. Other limitations of the related art will become apparent upon a reading of the specification and a study of the drawings.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 3 depicts a flowchart of an example of a process to support monitoring and revocation of device access authorization in accordance with some embodiments.

DETAILED DESCRIPTION OF EMBODIMENTS

Figure 1:
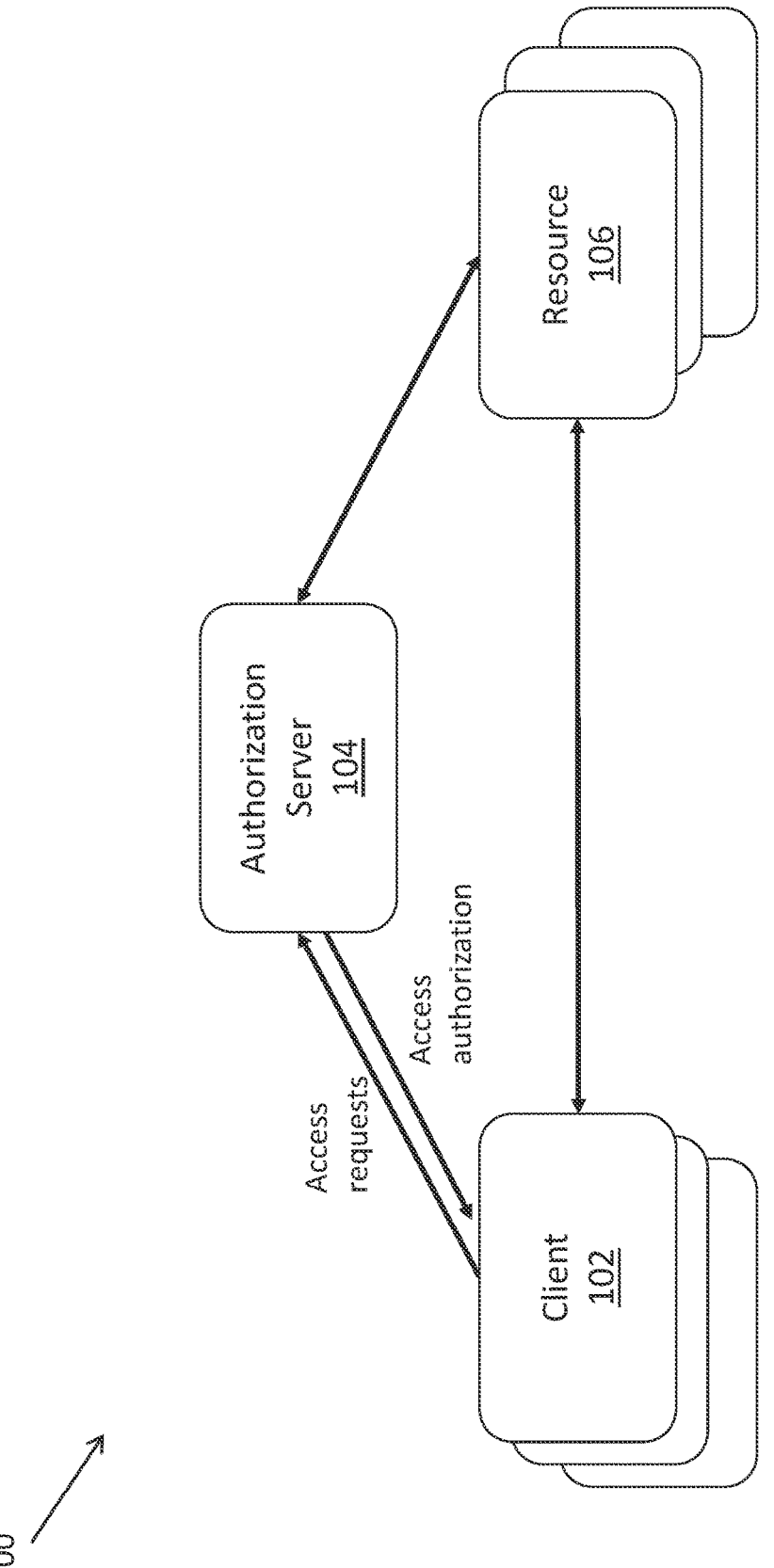
FIG. 1 depicts an example of a system diagram to support monitoring and revocation of device access authorization in accordance with some embodiments.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

A new approach is proposed that contemplates systems and methods to support an authorization server to continuously monitor and revoke device access authorization to a plurality of resources. A client device associated with a user or consumer (e.g., a support personnel) first sends a request to the authorization server for authorization to access or perform certain operations on one or more resources. Upon receiving the request, the authorization server makes an initial authorization determination on whether to grant or deny the request for authorization to the one or more resources by the client device based on the type of the request and/or the one or more resources requested to access. After an initial authorization determination is made, the authorization server continues to monitor the resources being accessed and update (authorize/permit or revoke/deny) the initial authorization determination to the client device in real time. A live update in the authorization determination made by the authorization server for the given client device to access the one or more resources is provided to the client device subscribed to the live update in real time, allowing the client device and/or its user to react to the changes and to adjust access to the resources accordingly.

Unlike other authorization systems currently in use, the proposed approach is capable of providing live updates to connecting clients about their authorization statuses (e.g., their authorization may no longer be valid) thus allowing the clients to take appropriate steps to address resources that are currently being accessed/in use. For a non-limiting example, in the case of a support tunnel used by an authorized support personnel, the proposed approach first issues a warning to the authorized support personnel that he/she is losing access authorization beyond a certain period of time, with steps to renew the access authorization if necessary, before actively cutting access authorization by the authorized personnel after the certain period of time has passed. For another non-limiting example, in the case of an account compromised by an attack (e.g., account takeover or ATO), the proposed approach has the ability to not just passively cut off access to resources being accessed by the compromised account, but also to actively ensure that the compromised account can no longer be used to start future connections to the resources.

FIG. 1 depicts an example of a system diagram 100 to support monitoring and revocation of device access authorization. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

In the example of FIG. 1, the system 100 includes one or more client devices 102, an authorization server 104, and one or more resources 106. Each of these components s in the system 100 is/runs on one or more computing units/appliances/devices/hosts (not shown) each having one or more processors and software instructions stored in a storage unit such as a non-volatile memory of the computing unit for practicing one or more processes. When the software instructions are executed, at least a subset of the software instructions is loaded into memory (also referred to as primary memory) by one of the computing units, which becomes a special purposed one for practicing the processes. The processes may also be at least partially embodied in the computing units into which computer program code is loaded and/or executed, such that, the host becomes a special purpose computing unit for practicing the processes.

In the example of FIG. 1, each computing unit can be a computing device, a communication device, a storage device, or any computing device capable of running a software component. For non-limiting examples, a computing device can be but is not limited to a server machine, a laptop PC, a desktop PC, a tablet, a Google Android device, an iPhone, an iPad, and a voice-controlled speaker or controller. Each of these components in the system 100 is associated with one or more communication networks (not shown), which can be but is not limited to, Internet, intranet, wide area network (WAN), local area network (LAN), wireless network, Bluetooth, Wi-Fi, and mobile communication network for communications among the engines. The physical connections of the communication networks and the communication protocols are well known to those skilled in the art.

In the example of FIG. 1, each of the one or more client devices 102 is configured to send a request to the authorization server 104 for authorization to access and/or to perform certain operations on the one or more resources 106. In some embodiments, the one or more resources 106 are access-controlled, meaning that a client device 102 needs to get an authorization from the authorization server 104 first before being allowed to access or perform an operation on the one or more resources 106. Here, each of the access-controlled one or more resources 106 can be a device, an appliance, a machine, or any type of computing unit described above, wherein each of the one or more resources 106 provides one or more certain functions and/or services e.g., web services/pages). For a non-limiting example, one of the one or more client devices 102 can be associated with a user (e.g., support personnel) intends to log into, access, and/or perform certain operations on a resource/device 106 via a support tunnel.

Figure 2:
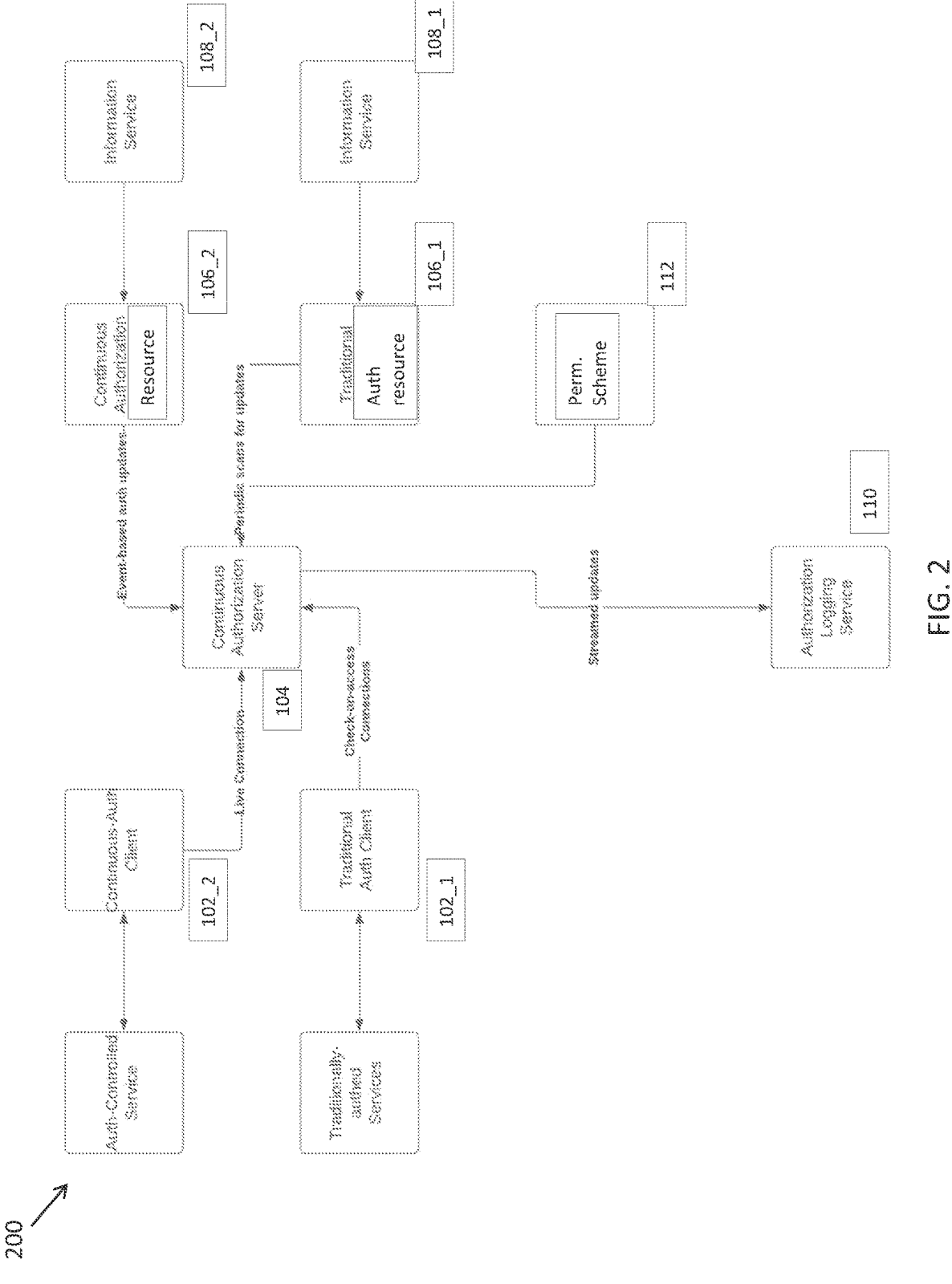
FIG. 2 depicts an example of a system diagram to support monitoring and revocation of device access authorization where the authorization server supports both the check-on-access authorization mode and the continuous authorization mode in accordance with some embodiments.

In the example of FIG. 1, upon receiving the request for authorization from the client device 102, the authorization server 104 is configured to determine whether to grant or deny the request for authorization to access the one or more resources 106 by the client device 102 based on the type of the client device 102, the request, and/or the resources 106 requested. In some embodiments, the authorization server 104 is configured to operate in one of two modes: check-on-access authorization mode and continuous authorization mode. FIG. 2 depicts an example of a system diagram 200 where the authorization server 104 supports both the check-on-access authorization mode and the continuous authorization mode.

Under the check-on-access authorization mode, when a client device 102_1 sends a request to the authorization server 104 for authorization to access an access-controlled resource 106_1, the authorization server 104 is configured to check only at that point in time of the request for authorization is received to determine if the client device 102_1 can have access to the access-controlled resource 106_1 or not. For a non-limiting example, the access-controlled resource 106_1 can be a web page. While the client device 102_1 has been granted access to the web page and is browsing the web page via a web browser, the web page will not be actively removed from the web browser of the client device 102_1 even when the client device 102_1's access to the web page has been revoked by the authorization server 104, e.g., when its access time period has expired.

In some embodiments, the authorization server 104 is configured to communicate with and to obtain/retrieve information from a point-in-time information service 108_1 connected to the resource 106_1, wherein such information is used to determine access authorization for the client device 102_1 under the check-on-access authorization mode. In some embodiments, the authorization server 104 is configured to poll/scan the point-in-time information service periodically, which yields point-in-time information for the check-on-access authorization mode. In some embodiments, the authorization server 104 is configured to convert that information to a stream of information for live streaming internally to the client device 102_1 so that the client device 102_1 can at least have its access authorization validated with the latest information from the resource 106_1. In some embodiments, the authorization server 104 is configured to utilize polling as a synchronization fallback for the streaming to maintain up-to-date information even if some of the information is missed or lost during streaming. In some embodiments, the authorization server 104 offers an Application Programming Interface (API) on the client end, which the client device 102_1 may call/invoke to obtain the information under the check-on-access authorization mode in order to be in sync as of the time of its request for authorization to the authorization server 104.

Since resources may remain in use by a client device 102 or its user for days or months, a live continuous authorization model becomes necessary. Under the continuous authorization mode, the authorization server 104 is configured to maintain a live connection to a client device 102_2 in order to monitor/track which of the access-controlled resources 106_2 are currently in use or being accessed. If access authorization determination changes for a given resource 106_2, the authorization server 104 is configured to propagate an update to the access authorization determination live to the client devices 102_2 accessing those resources while maintaining the live connection. If access permission is revoked from the access-controlled resource 106_2 by the authorization server 104, the client device 102_2 will take active and immediate action regarding that resource's availability to a consumer of the resource 106_2, e.g., an authorization-controlled service. In some embodiments, the client device 102_2 immediate removes access to the resource 106_2, actively terminating live use of the resources such as viewing, etc. In some embodiments, the client device 102_2 generates a warning about the fact that access has been terminated but waiting for another indication from the authorization server 104 that access to the resource 106_2 should be shut off, such as a timer or a human action. This is helpful in situations where the consumer of the resource 106_2 may need some time to finalize its access to the resource and it is not security-critical that it be cut off at the exact instant access was lost, but that access does need to be revoked. This also allows the consumer to take actions that may result in the access authorization being reactivated later by the authorization server 104 before a grace period is up, in which case the access is never lost, and any live connection that may be active remain alive. In some embodiments, human intervention in the access is possible as well; wherein a human (e.g., a support personnel) can be alerted that the time is up so that he/she can make access decisions in real-time, with immediate effect.

In some embodiments, the authorization server 104 is configured to connect to/communicate with external/remote information services, e.g., 108_2, which stream/yield information used for authorization by the authorization server 104 on a continual basis under the continuous authorization mode. In some embodiments, the authorization server 104 accepts the streamed information in whatever format the remote sources 108_2 offer such information and converts such information into its internal representation for analysis. The authorization server 104 then uses this information to lively update its connected client devices, e.g., 102-2, about any relevant changes. For a non-limiting example, the authorization server 104 may receive information about status of a support cases from an external source (e.g., a system admin of a customer) in real time and use such information to control who is allowed to log in to the resource 106_2, e.g., the customer's remote system, for diagnostic purposes. The support staff is only allowed to access the remote system while a support case is currently open (as well as a possible brief grace period). In some embodiments, the authorization server 104 is configured not only to shut down access authorization to the resource 106_2 in a timely manner for security implications, but also to quickly restore access authorization to the resource 106_2 such that support staff does not have to wait for access and can timely resolve the customer's problems.

In some embodiments, the authorization server 104 is configured to provide/stream live logging/auditing/updates about the authorization status of its users to an external service, which can be but is not limited to, an auditing service or an authorization logging service 110. Users of such service can then take certain further actions triggered by the auditing events/updates streamed by the authorization server 104.

In some embodiments, in addition to connecting to automated services discussed above, the authorization server 104 is configured to permit live interactions with a permission scheme 112 for access authorization control by users, which determination on access authorization may also take immediate effect. For a non-limiting example, the permission scheme 112 may include an emergency switch that can block a given client device 102 from accessing certain resources 106, wherein such revoke or denial of authorization takes immediate effect, even including bypassing the grace period mentioned above. In case of security breach, in addition to generally controlling/blocking an attacker's access to privileged services or information as the attacker attempts to do so, access to resources 106 protected by the live information streaming/updates on security event can be immediately and proactively revoked. In some embodiments, the permission scheme 112 may include a switch for opening access in general in an emergency, for a non-limiting example, when the authorization server 104 may be unavailable or misbehaving, and it is deemed necessary by the business (or a system admin) to temporarily bypass these permissions. For a non-limiting example, permission scheme 112 may also make sure that the grace period interval will be correctly satisfied and not cut client devices 102 off once this switch is flipped.

In some embodiments, the permission scheme 112 discussed above can also be extended into a workflow permission system, where users make requests for access to certain resources, and a human may intervene actively make decisions about access permission or authorization. For the users waiting for access to the resources, access would be immediately available without further polling by the authorization server 104. In some embodiments, the permission scheme 112 also permits certain policies, decisions, and mechanisms to be implemented with acceptable performance and experience for the users.

FIG. 3 depicts a flowchart 300 of an example of a process to support monitoring and revocation of device access authorization. Although the figure depicts functional steps in a particular order for purposes of illustration, the processes are not limited to any particular order or arrangement of steps. One skilled in the relevant art will appreciate that the various steps portrayed in this figure could be omitted, rearranged, combined and/or adapted in various ways.

In the example of FIG. 3, the flowchart 300 starts at block 302, where a request from a client device associated with a user or consumer for authorization to access or perform certain operations on one or more resources is accepted. The flowchart 300 continues to block 304, where an initial authorization determination is made on whether to grant or deny the request for authorization to the one or more resources by the client device based on type of the request and/or the one or more resources requested to access. The flowchart 300 continues to block 306, where the one or more resources being accessed are continued to be monitored after the initial authorization determination is made and the initial authorization determination to the client device is updated in real time. The flowchart 300 ends at block 308, where a live update in the authorization determination for the given client device to access the one or more resources is provided to the client device subscribed to the live update in real time.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

The methods and system described herein may be at least partially embodied in the form of computer-implemented processes and apparatus for practicing those processes. The disclosed methods may also be at least partially embodied in the form of tangible, non-transitory machine readable storage media encoded with computer program code. The media may include, for example, RAMs, ROMs, CD-ROMs, DVD-ROMs, BD-ROMs, hard disk drives, flash memories, or any other non-transitory machine-readable storage medium, wherein, when the computer program code is loaded into and executed by a computer, the computer becomes an apparatus for practicing the method. The methods may also be at least partially embodied in the form of a computer into which computer program code is loaded and/or executed, such that, the computer becomes a special purpose computer for practicing the methods. When implemented on a general-purpose processor, the computer program code segments configure the processor to create specific logic circuits. The methods may alternatively be at least partially embodied in a digital signal processor formed of application specific integrated circuits for performing the methods.

What is claimed is:

1. A system, comprising:

an authorization server configured to accept a request from a client device associated with a user for authorization to access or perform certain operations on one or more resources;

make an initial authorization determination on whether to grant or deny the request for authorization to the one or more resources by the client device based on type of the request and/or the one or more resources requested to access;

under a continuous authorization mode, maintain a live connection to the client device after the initial authorization determination;

continue to monitor, via the live connection maintained with the client device, the one or more resources being accessed by the client device after the initial authorization determination is made;

responsive to a change in an access authorization determination for a given resource of the one or more resources, provide, in real-time and while maintaining the live connection with the client device, a live update of the change in the authorization determination to the client device accessing the given resource; and reactivate an access authorization to the given resource within a predetermined interval of time, wherein, based on the access authorization being reactivated within a predetermined interval of time, the client device maintains access to the given resource and the authorization server maintains the live connection with the client device.

2. The system of claim 1, wherein:

each of the one or more resources is one of a device, an appliance, a machine, and a computing unit, wherein each of the one or more resources provides one or more functions and/or services.

3. The system of claim 1, wherein:

the authorization server is configured to operate in two modes: check-on-access authorization mode and continuous authorization mode.

4. The system of claim 3, wherein:

the authorization server is configured to check only at point in time of the request for authorization is received from the client device to determine if the client device can have access to the one or more resource or not under the check-on-access authorization mode.

5. The system of claim 3, wherein:

the authorization server is configured to communicate with and to obtain information from a point-in-time information service connected to the one or more resources, wherein such information is used to determine access authorization for the client device under the check-on-access authorization mode.

6. The system of claim 5, wherein:

the authorization server is configured to poll the point-in-time information service periodically, which yields the information for the check-on-access authorization mode.

7. The system of claim 3, wherein:

the authorization server is configured to maintain a live connection to the client device in order to monitor which of the one or more resources are currently in use or being accessed under the continuous authorization mode.

8. The system of claim 7, wherein:

the authorization server is configured to communicate with an external information service, which streams information used for authorization on a continual basis under the continuous authorization mode.

9. The system of claim 1, wherein:

the authorization server is configured not only to shut down access authorization to one or more resources for security implications but also to restore access authorization to the resource in a timely manner.

10. The system of claim 1, wherein:

the authorization server is configured to stream the live update to an external auditing service or authorization logging service.

11. The system of claim 1, wherein:

the authorization server is configured to permit live interactions with a permission scheme for access authorization control by the user.

12. A computer-implemented method, comprising:

accepting, by an authorization server, a request from a client device associated with a user for authorization to access or perform certain operations on one or more resources;

making an initial authorization determination on whether to grant or deny the request for authorization to the one or more resources by the client device based on type of the request and/or the one or more resources requested to access;

under a continuous authorization mode, maintaining a live connection to the client device after the initial authorization determination;

continuing to monitor, via the live connection maintained with the client device, the one or more resources being accessed by the client device after the initial authorization determination is made;

responsive to a change in an access authorization determination for a given resource of the one or more resources, providing, in real-time and while maintaining the live connection with the client device, a live update of the change in the authorization determination to the client device accessing the given resource; and reactivating an access authorization to the given resource within a predetermined interval of time, wherein, based on the access authorization being reactivated within a predetermined interval of time, the client device maintains access to the given resource and the authorization server maintains the live connection with the client device.

13. The method of claim 12, further comprising:

checking only at point in time of the request for authorization is received from the client device to determine if the client device can have access to the one or more resource or not under a check-on-access authorization mode.

14. The method of claim 13, further comprising:

communicating with and to obtain information from a point-in-time information service connected to the one or more resources, wherein such information is used to determine access authorization for the client device under the check-on-access authorization mode.

15. The method of claim 14, further comprising:

polling the point-in-time information service periodically, which yields the information for the check-on-access authorization mode.

16. The method of claim 12, further comprising:

maintaining a live connection to the client device in order to monitor which of the one or more resources are currently in use or being accessed under a continuous authorization mode.

17. The method of claim 16, further comprising:

communicating with an external information service, which stream information used for authorization on a continual basis under the continuous authorization mode.

18. The method of claim 12, further comprising:

not only shutting down access authorization to the one or more resources for security implications but also restoring access authorization to the resource in a timely manner.

19. The method of claim 12, further comprising:

streaming the live update to an external auditing service or authorization logging service.

20. The method of claim 12, further comprising:

permitting live interactions with a permission scheme for access authorization control by the user.

21. A non-transitory storage medium having software instructions stored thereon that when executed cause an authorization server to:

accept a request from a client device associated with a user for authorization to access or perform certain operations on one or more resources;

make an initial authorization determination on whether to grant or deny the request for authorization to the one or more resources by the client device based on type of the request and/or the one or more resources requested to access;

under a continuous authorization mode, maintain a live connection to the client device after the initial authorization determination;

continue to monitor, via the live connection maintained with the client device, the one or more resources being accessed by the client device after the initial authorization determination is made;

responsive to a change in an access authorization determination for a given resource of the one or more resources, provide, in real-time and while maintaining the live connection with the client device, a live update of the change in the authorization determination to the client device accessing the given resource; and reactivate an access authorization to the given resource within a predetermined interval of time, wherein, based on the access authorization being reactivated within a predetermined interval of time, the client device maintains access to the given resource and the authorization server maintains the live connection with the client device.

* * * * *